US012361296B2

(12) United States Patent
Ravizza et al.

(10) Patent No.: US 12,361,296 B2
(45) Date of Patent: Jul. 15, 2025

(54) ENVIRONMENT AUGMENTATION BASED ON INDIVIDUALIZED KNOWLEDGE GRAPHS

(71) Applicant: International Business Machines Corporation, Armonk, NY (US)

(72) Inventors: Stefan Ravizza, Wallisellen (CH); Matthias Biniok, Marburg (DE); Frederik Frank Flöther, Schlieren (CH); Patrick Lustenberger, Herrliberg (CH); David Ocheltree, Peachtree City, GA (US); Saurabh Yadav, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1145 days.

(21) Appl. No.: 17/102,651

(22) Filed: Nov. 24, 2020

(65) Prior Publication Data

US 2022/0164680 A1    May 26, 2022

(51) Int. Cl.
*G06N 5/022* (2023.01)
*G06N 3/042* (2023.01)
*G06N 3/045* (2023.01)

(52) U.S. Cl.
CPC .............. *G06N 5/022* (2013.01); *G06N 3/042* (2023.01); *G06N 3/045* (2023.01)

(58) Field of Classification Search
CPC ........ G06N 5/022; G06N 3/042; G06N 3/045; G06N 20/00; G06N 5/02
See application file for complete search history.

(56) References Cited

U.S. PATENT DOCUMENTS 9,229,231 B2    1/2016   Small
2014/0282219 A1    9/2014   Haddock
(Continued)

FOREIGN PATENT DOCUMENTS

CN    102737120 B    5/2015
CN    106777127 B    5/2020
(Continued)

OTHER PUBLICATIONS

Anonymous et al., "What is a Knowledge Graph?", Ontotext, Accessed on Nov. 6, 2020, 8 Pages.
(Continued)

*Primary Examiner* — Alexey Shmatov
*Assistant Examiner* — Devika S Maharaj
(74) *Attorney, Agent, or Firm* — Joseph P. Curcuru (57) ABSTRACT

In an approach, a processor creates a multi-layered knowledge graph (KG), wherein a first layer is a core KG, a second layer has application-specific structured facts, and a third layer has individualized facts. A processor adapts weights in each layer of the multi-layered KG based on the individualized facts. A processor uses, as input data to the multi-layered KG, individual environmental data. A processor maps the input data to the multi-layered KG in a sequence of the first layer, the second layer, and the third layer. A processor selects, as relevant nodes in the first layer and the second layer, the relevant nodes lying on a selected path from the input data via the first layer, the second layer, and the third layer having the highest average weight value along the selected path. A processor outputs facts of the relevant nodes from the first layer and the second layer.

20 Claims, 6 Drawing Sheets

(56) References Cited

U.S. PATENT DOCUMENTS

| | | | |
|---|---|---|---|
| 2014/0289323 | A1 | 9/2014 | Kutaragi |
| 2015/0123966 | A1 | 5/2015 | Newman |
| 2015/0370787 | A1* | 12/2015 | Akbacak ................. G06F 40/47 704/2 |
| 2017/0147635 | A1* | 5/2017 | McAteer ............. G06F 16/2246 |
| 2019/0042988 | A1* | 2/2019 | Brown ................ G06F 16/9535 |
| 2019/0286743 | A1* | 9/2019 | Lecue .................... G06F 16/367 |
| 2019/0286950 | A1* | 9/2019 | Kiapour ................ G06F 16/532 |
| 2021/0174217 | A1* | 6/2021 | Pai ............................ G06N 3/08 |
| 2021/0241050 | A1* | 8/2021 | Gunaratna ............. G06N 3/042 |
| 2022/0415199 | A1* | 12/2022 | Venkatasubramanyam ................. G06F 16/9535 |

FOREIGN PATENT DOCUMENTS

| | | |
|---|---|---|
| JP | 5189128 B2 | 4/2013 |
| KR | 20150080556 A | 7/2015 |

OTHER PUBLICATIONS

Authors et al. Disclosed Anonymously, "Real-Time Learning with Augmented Reality (AR) Assistance", An IP.com Prior Art Database Technical Disclosure, IP.com No. IPCOM000260175D, IP.com Electronic Publication Date: Oct. 28, 2019, 4 Pages.

Czekala, Bartosz, "The Truth About Effectiveness and Usefulness Of Mnemonics In Learning", Universe of Memory, Accessed on Nov. 6, 2020, 10 Pages.

Gandhi, Rohith, "Generative Adversarial Networks—Explained", Towards Data Science, May 10, 2018, 7 Pages.

Gautam, Shuchita, "Coronavirus: Harvard joins growing list of universities to go online-only next academic year", The National News, Jun. 4, 2020, 5 Pages.

Grosse-Boelting et al., "Generic Process for Extracting User Profiles from Social Media using Hierarchical Knowledge Bases", 2015 IEEE International Conference on Semantic Computing (ICSC), Jan. 2015, 4 Pages.

Knapton, Sarah, "AlphaGo Zero: Google DeepMind supercomputer learns 3,000 years of human knowledge in 40 days", The Telegraph, United Kingdom, Oct. 18, 2017, 6 Pages.

Lei, Nin, "Generative Adversarial Network technology: AI goes mainstream", IBM, Sep. 17, 2019, 2 Pages.

Martin, Andrew, "Intro to Adversarial Machine Learning and Generative Adversarial Networks", KDnuggets News, Oct. 2019, 11 Pages.

Porter et al., "Why Every Organization Needs an Augmented Reality Strategy", Harvard Business Review, Nov.-Dec. 2017, 14 Pages.

Rocca, Joseph, "Understanding Generative Adversarial Networks (GANs)", Towards Data Science, Jan. 7, 2019, 21 Pages.

Wikimedia Commons, "Reinforcement learning diagram", Wikimedia Commons, Accessed on Nov. 6, 2020, 4 Pages.

Wikipedia, "Elaborative encoding", Wikipedia, Accessed on Nov. 6, 2020, 6 Pages.

Wikipedia, "Method of loci", Wikipedia, Accessed on Nov. 6, 2020, 7 Pages.

Wikipedia, "Mnemonic", Wikipedia, Accessed on Nov. 6, 2020, 11 Pages.

Wikipedia, "Q-learning", Wikipedia, Accessed on Nov. 6, 2020, 8 Pages.

Xu, Joyce, "Beyond DQN/A3C: A Survey in Advanced Reinforcement Learning", Towards Data Science, Oct. 1, 2018, 15 Pages.

Yse, Diego Lopez, "Your Guide to Natural Language Processing (NLP)", Towards Data Science, Jan. 15, 2019, 13 Pages.

\* cited by examiner

ENVIRONMENT AUGMENTATION BASED ON INDIVIDUALIZED KNOWLEDGE GRAPHS

BACKGROUND

The invention relates generally to knowledge graphs, and more specifically, to providing an individualized enhancement to a knowledge graph.

For organizing facts and content in the form of structured, semi-structured, and so-called unstructured data, a knowledge graph may be instrumental. Large amounts of content have already been structured in knowledge graphs. Enterprises have also started to structure their enterprise intellectual property (IP) in knowledge graphs for certain domains, like, production and recipe data, service manual information, supplier related data, customer data, and so on.

Nowadays, understanding and learning of new content becomes more and more important in a world where the half-value time of knowledge is getting shorter and shorter. A key approach to addressing this challenge may comprise mnemonic techniques (IP elaborate if encoding, method of loci/memory places, etc.), wherein retention and rise of the new material is enhanced by linking it to prior knowledge. The literature is full of recommendations on how to structure and learn content in new domains.

In particular, there are differences in the optimal learning strategy from person-to-person. For example, visual learners significantly benefit from getting a meaningful image to support the efficiency of learning. Other learners benefit more from audio data. In most cases, a combination of visual, audio, and haptic information may be instrumental for learning content in a new knowledge domain

SUMMARY

Aspects of an embodiment of the present invention disclose a method, computer program product, and computer system for providing an individualized enhancement to a knowledge graph for improving an individual experience with the knowledge graph may be provided. A processor creates a multi-layered knowledge graph, wherein the multi-layered knowledge graph comprises nodes and weighted edges in each layer, and wherein a first layer is a core knowledge graph, a second layer has application-specific structured facts, and a third layer has individualized facts. A processor adapts weights in each layer of the multi-layered knowledge graph based on the individualized facts. A processor uses, as input data to the multi-layered knowledge graph, individual environmental data. A processor maps the input data to the multi-layered knowledge graph in a sequence of the first layer, the second layer, and the third layer. A processor selects, as relevant nodes in the first layer and the second layer, the relevant nodes lying on a selected path from the input data via the first layer, the second layer, and the third layer having the highest average weight value along the selected path. A processor outputs facts of the relevant nodes from the first layer and the second layer.

In some aspects of an embodiment of the present invention, the individual environmental data comprises current environmental data at a time of the mapping, the selecting, and the outputting.

In some aspects of an embodiment of the present invention, the current environmental data comprise at least one of image data, sensor data, sound data, and an explicit query.

In some aspects of an embodiment of the present invention, for adapting the weights in each layer of the multi-layered knowledge graph based on the individualized facts, a processor increases weight factors along the selected path.

In some aspects of an embodiment of the present invention, for outputting the facts of the relevant node from the first layer and the second layer, a processor selects, as a relevant node, a node of the third layer; and augmenting, by the one or more processors, the input data with at least one of the facts of the selected nodes.

In some aspects of an embodiment of the present invention, a processor translates text of the facts of the selected nodes into a selectable language.

In some aspects of an embodiment of the present invention, a processor merges an input image with an output image from one of the selected nodes using a generative adversarial network.

In some aspects of an embodiment of the present invention, responsive to outputting the facts of the relevant node, a processor receives feedback data. A processor adjusts the weights along the selected path according to the received feedback data.

In some aspects of an embodiment of the present invention, a processor adds edges and/or weights between nodes of the first layer and nodes of the second layer to nodes of the third layer using selected path data from another knowledge graph of a same kind of knowledge graph.

BRIEF DESCRIPTION OF THE DRAWINGS

Embodiments of the invention will be described, by way of example only, and with reference to the following drawings.

DETAILED DESCRIPTION

In the context of this description, the following conventions, terms and/or expressions may be used:

The term 'individualized enhancement' may denote additional data, e.g., in the form of images or sound clips, adapted to enhance something a user currently looks at or hears. These additional data may be augmented or merged with a current view on a specific scene. The scene was created in order to be fed as an image to the underlying multi-layer knowledge graph system as a query basis.

The term 'knowledge graph' may denote a plurality of facts stored in nodes selectively connected via linking edges, each storing a weight factor according to a strength value of a relationship between respective nodes. Also, other attributes may be stored in/by the edges expressing other, more complex types of relationships between the nodes. In this sense, the knowledge graph may represent a collection of interlinked descriptions of entities, i.e., real-word objects, events, situations or abstract concepts, in which descriptions have a formal structure that may allow people as well as computers to process them in an efficient and unambiguous manner, and in which entity descriptions contribute to one another, forming a network, wherein each entity may represent a part of the description of the entity related to it.

The term 'individual experience' may denote a plurality of impressions for a user. One portion of the impressions may come from the observed reality around the user and another portion of the impressions may come in form of the individualized enhancements extracted from the multi-layered knowledge graph and potentially augmented with the observed reality.

The term 'multi-layered knowledge graph' may denote a knowledge graph as defined above with a plurality of core facts as a first layer, and additional, application-specific structured facts for a predefined set of topics in a second layer, wherein the multi-layered knowledge graph may also comprise a third layer of individualized facts which may represent impressions, i.e., images, of a user's history.

The term 'core knowledge graph' may denote the first layer of the multi-layered knowledge graph.

The term 'application-specific structured facts' may denote structured, mainly number-based additional information to the core terms and facts comprised in the first layer of the multi-layered knowledge graph.

The term 'third layer of individualized facts' may denote a plurality of different facts collected by the user in the form of images of a camera, smart glasses, a smart phone camera, and a plurality of sensor data collecting additional information of a scene in which the user was present.

The term 'relevant nodes' may denote a plurality of nodes on a path through the multi-layered knowledge graph from, e.g., an image used as input data which may firstly be mapped to the first layer of the multi-layered knowledge graph and then further via the second layer to the third layer of the multi-layered knowledge graph. This way, a couple of potential paths may be generated with different weights between the related facts/nodes. Based on this, a selected path may be determined.

The term 'selected path' may denote the preferred path through the multi-layered knowledge graph based on a given input or query to the knowledge graph. The selected path may be determined as the path having the highest average weight values along the path. This way, longer paths may not be selected automatically and due to a higher sum of weight values. Instead, the sum may be normalized by the number of nodes on the path.

The term 'natural language processing' (NLP) may refer to the field concerned with the interaction between computers and human languages. It consists of applying data science to human languages and enabling computers to process and make sense of natural language data. The term 'NLP may be used for analyzing written text, spoken words, or spoken text or for synthesizing computer-generated sound impulses understandable as spoken words out of a stored text.

The term 'augmented reality' (AR) may denote an enhancement of an experience by a user of a real-world environment with additional computer-generated or computer retrieved information. This may include images or information in other modalities, such as auditory, haptic, somatosensory, and olfactory.

The term 'generative adversarial network' (GAN) may refer to a class of machine learning (ML) systems. An underlying network learns to generate from a training distribution through a two-player game. The two opponents/adversaries are in constant battle throughout the training process. One opponent is used to generate real-looking images and the other opponent's job is to identify which one is a fake. The term is used herein as known in the art of computer science.

The term 'reinforcement learning' (RL) may concern the behavior of software agents that act in an environment in order to maximize some notion of reward. Also, this term is used herein as known in the art of computer science.

Embodiments of the present invention provide a method for providing an individualized enhancement to a knowledge graph to improve an individual experience with the knowledge graph may offer multiple advantages, contributions, and technical effects:

Embodiments of the present invention can support understanding and learning of new content by its user by using mnemonic techniques by which retention and grasp of the new content material is enhanced by prior knowledge, i.e., by the user's history which may have been stored digitally in forms of images, sound clips, and other environment data from, e.g., IoT sensors or body sensors. Embodiments of the present invention may also support learning technique differences from person to person based on the personal or individualized content in the multi-layered knowledge graph. The history may also include content viewed through an internet channel (e.g., streamed content) or books and magazines read.

Another benefit is that the used process for enhancing a user experience can easily be "explained" through the knowledge graph backbone and its structure, i.e., the selected path, which may be especially relevant with the trending topics "ethical AI" and XAI (explainable AI), since the multi-layered knowledge graph can always provide evidence of its output due to the traceable rules according to which embodiments of the present invention work.

The way to visualize the results, e.g., as augmented images comprising a current view or scene and a view/image from the knowledge graph, is using the fastest communication channel a human being has, namely its visual channel It may also be supported by sound and more; hence a complete VR output may be generated to enhance the user's experience.

Although one aspect of embodiments of the present invention is to provide a technically supporting system for learning new content by analyzing the environment of a user and determining and providing the right information to a user, embodiments of the present invention may also be used for infotainment, which has many overlaps with training and learning of people. The inventive concept may also be used as a tool for providing information about interesting places nearby a current position of a user. If a user is standing in front of Big Ben in London, the underlying system may suggest to also visit the Tower of London. Moreover, the user may also receive other places of interest nearby, e.g., restaurants or shopping locations for tourists.

Another example of this infotainment application may be the following: If the user stands in front of the replica of the Eiffel Tower in Las Vegas, he may also be shown, by means of the multi-layered knowledge graph and the related system, a height comparison and other interesting data with the original Eiffel Tower in Paris. And as an additional benefit, the user may also be informed about a nearby French restaurant. Hence, embodiments of the present invention may have a large variety of implementation options including as a learning platform, for maintenance tasks, as a tourist guide, and as advertising platform. Depending on the environment the user is currently present, the system may also automatically change its behavior in order to propose the most appropriate information for the user, e.g., during the weekend and vacation time other data if compared to business travel or repairing a device for a customer.

According to an additional embodiment, the individual environmental data may comprise current or actual environmental data, e.g., of a person using the knowledge graph. Thus, the person using the knowledge graph may augment their environmental experience with additional data from the multi-layered knowledge graph.

According to an additional embodiment, the current environmental data may comprise at least one of image data sensor data, sound data, and an explicit query. Thereby, the image data sensor may be a smartphone or smart device camera, a camera from smart glasses, and/or a camera from a surveillance system in an area of the user. In addition to the image data, sound data may also be used as current environmental data. These may come from a microphone-type sensor.

Additionally, a large variety of other sensors may be used to produce current environmental data, any form of Internet-of-Things (IoT) data, temperature data, humidity data, light intensity data, time in a day, GPS location data (i.e., in the context of a current location of the user), day of a week, a month, weather data, information of being inside or outside of a building, a car, a subway, information about a mode of travel (e.g., walking, running, biking, motorcycling, sailing, flying, swimming), etc. Furthermore, olfactory data, i.e., smell data, may be used, being delivered from chemical/biological-electronic sensors. Furthermore, data about an emotional state of the user, eye tracking data, the person's temperature data, and conductivity data of the skin, and so on, may be used.

According to an embodiment, the adaption of weights in all layers of the knowledge graph based on the individualized facts may comprise increasing, but also decreasing, selectively, weight factors along a selected path from the first layer, via the second layer to the individualized facts of a third layer. Hence, the connections or relation between facts of the individual data-carrying layer, i.e. the third layer, and facts of the first and second layers may be reinforced. Therefore, for a specific user, certain facts in the core knowledge graph may be more relevant because of a personal experience linked from the third layer of the multi-layered knowledge graph to the second or the first layer.

According to an embodiment, the method may also comprise decreasing the weight factors along the selected paths depending on an age value of the individualized facts of the third layer. As an example, a user can remember details of a last vacation trip much more intensely and in greater detail if compared to a vacation journey 10 years ago. In other words, the older the individualized facts are, the weaker the link is via edges to subordinate layers of the knowledge graph. Additionally, the method may comprise decreasing the weight factors along the selected paths according to a penalty term, which may be decreased with a number of edges from nodes of the first layer and the second layer to a node in the third layer. The comparably high number of edges may express an unspecific linkage of the individualized facts to the layers below in the knowledge graph.

Generally, a linearly dependent combination of influence factors may be used to determine the strength of a relation, i.e., the weight value.

According to an embodiment, outputting the relevant node facts from the first layer and the second layer may also comprise selecting, a relevant node of the third layer and/or augmenting the input data with at least one of the facts of the relevant nodes. This may express data and facts of general relevance in light of the individualized data and the current experience of the environment received via sensors. The augmentation may be implemented via VR goggles or other types of mixed-mode devices.

According to an embodiment, the method may also comprise dynamically translating text of facts of the selected nodes into a selectable language. Hence, the output data may be delivered to the user in natural language form, if appropriate. The user may select a language preference, e.g., stored in the third layer of the knowledge graph. The translation for the outputting, i.e., augmentation, may be performed "on-the-fly", e.g., using another knowledge graph and a language processing system or a cloud computing based language synthesis system.

According to another embodiment, the method may also comprise merging an input image with an output image from one of the selected nodes using a GAN. This may generate very interesting super-positions of images of the received input images and images derived from the multi-layered knowledge graph. The same GAN or GAN system may also be used to smooth images stored in the third layer of the multilayered knowledge graph. This may make a recognition of individual aspects in the respective images computational-wise cheaper.

According to another embodiment, the method may also comprise: upon outputting the relevant node facts, receiving feedback data—in particular, from a user reacting to the output of the method and the underlying system—and adjusting the weights along the selected path according to the received feedback data. This may be carried out using a form of reinforcement learning. Hence, if the user may confirm in the feedback loop what was presented by the multi-layered knowledge graph and the related system that they liked the generated data, the weight values along the path of the relevant facts may be made adaptable, i.e., made stronger, selectively, otherwise weaker.

According to another embodiment, the method may also comprise adding and/or adjusting edges and/or weight factor values between nodes of the first layer and nodes of the second layer to nodes of the third layer using selected path data from another knowledge graph of the same kind. Although the other knowledge graph of the same kind may have a different third layer, links, and weight from other comparable knowledge graphs that may have been individualized by a different person's data, the weights reflecting a personal experience in the context of general knowledge may be adapted in the above sense. Hence, a crowdsourced knowledge process may be used to enhance the functioning and value of the individualized knowledge graph for an even more intensive augmented experience.

Implementation of embodiments of the invention may take a variety of forms, and exemplary implementation details are discussed subsequently with reference to the Figures.

Figure 1:
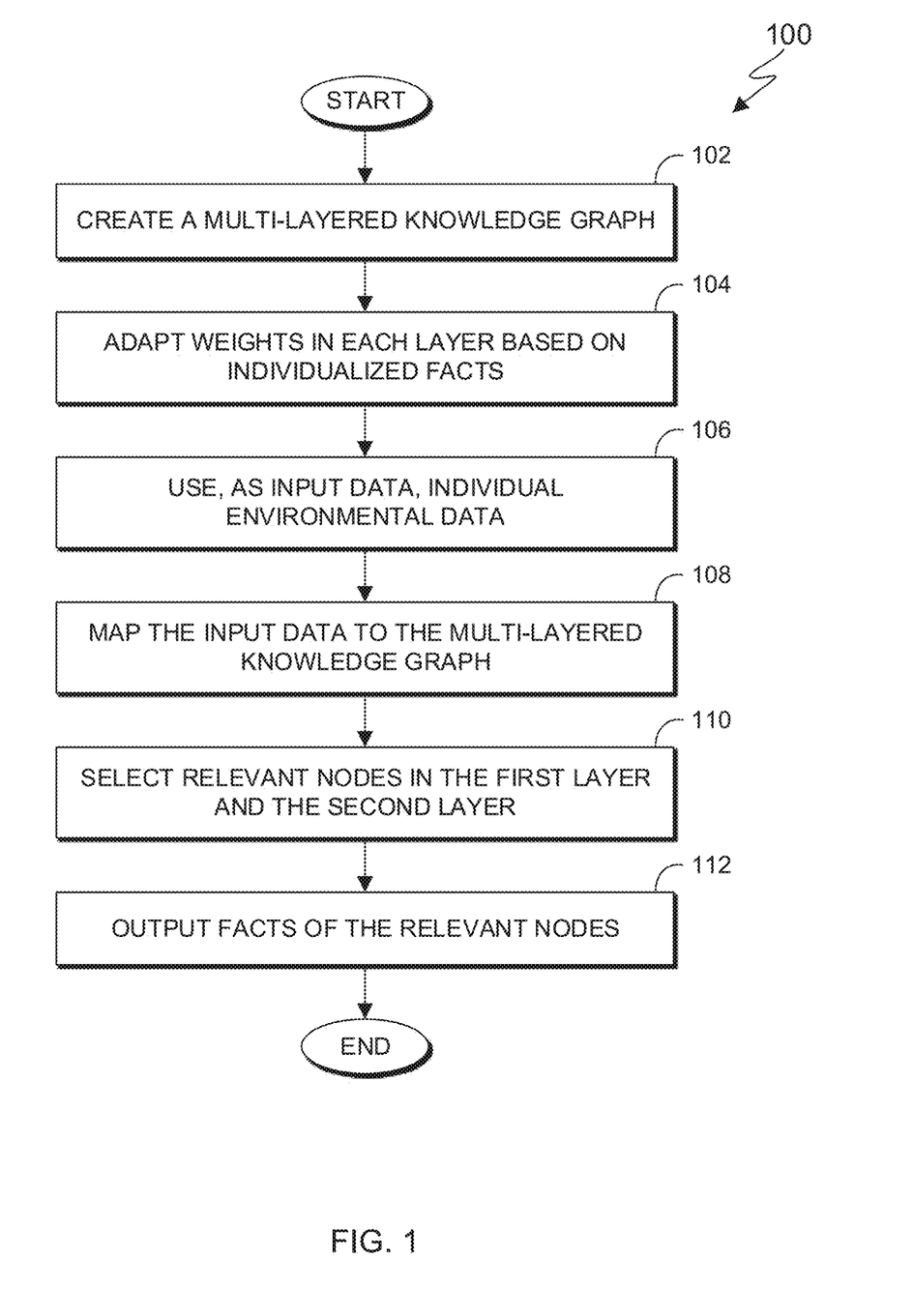
FIG. 1 shows a flowchart depicting operational steps of a computer-implemented method for providing an individualized enhancement to a knowledge graph, in accordance with an embodiment of the present invention.

FIG. 1 shows a flowchart depicting operational steps of computer-implemented method 100 for providing an individualized enhancement to a knowledge graph, e.g., in form of images, texts, and sound in accordance with an embodiment of the present invention. The method 100 comprises creating 102 a multi-layered knowledge graph, comprising nodes and weighted edges in each layer. Thereby, the knowledge graph comprises a core knowledge graph as a first layer, which may be an already existing knowledge graph, application-specific structured facts in a second layer (i.e., structured numbers, tables, and grammar tables), and a third layer of individualized facts, such as age, gender, education, and data about personal experiences of a user.

The method 100 comprises adapting 104 weights in all layers of the knowledge graph based on the individualized facts, including e.g., an age of references to a specific node or fact, how often and when it has been queried, etc.

Furthermore, the method 100 comprises using 106, as input data to the knowledge graph, individual environmental data, e.g., in the form of a photo from a camera based/smart glasses, IoT sensor data, received sound/speech, an Internet stream observed, an explicit query, etc.

Additionally, the method 100 comprises mapping 108 the input data to the knowledge graph in a sequence of the first layer, the second layer, and the third layer; selecting 110, as relevant nodes in the first and second layer, the relevant nodes lying on a selected path from the input data via the first layer, via the second layer to the third layer having the highest average weight value along the selected path; and outputting 112, e.g., in the form of a visualization via speech synthesis, the relevant node facts from the first layer and the second layer.

Figure 2:
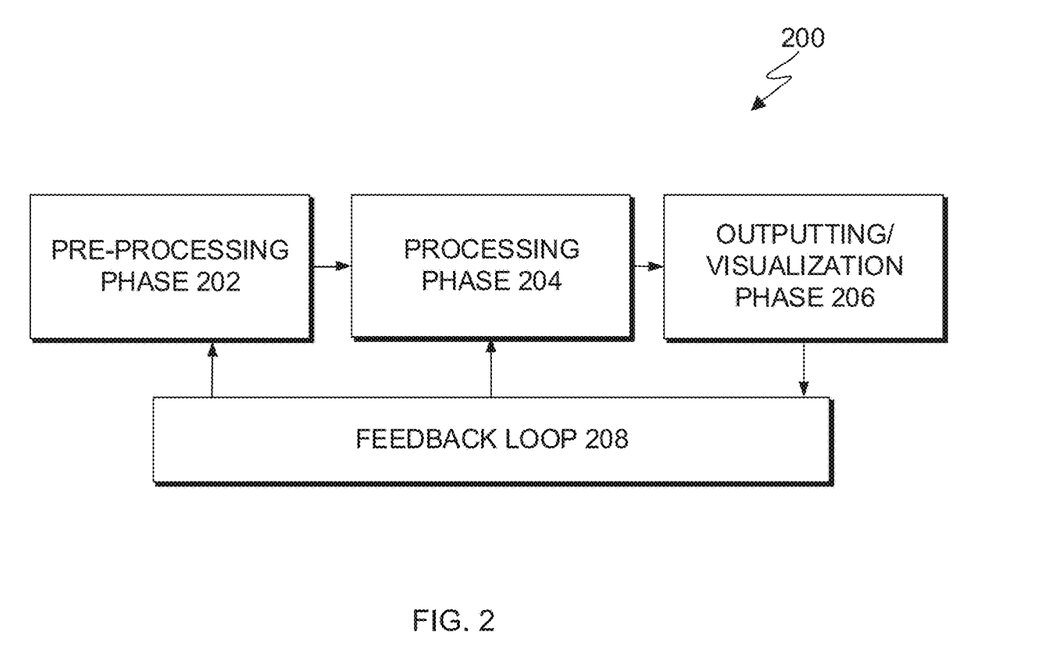
FIG. 2 shows a block diagram of a system for implementing the computer-implemented method of FIG. 1, in accordance with an embodiment of the present invention.

FIG. 2 shows a block diagram of system 200 for implementing the computer-implemented method of FIG. 1, in accordance with an embodiment of the present invention. The system 200 comprises three basic components or phases linked together by a feedback loop 208. The three basic components comprise a pre-processing phase 202, a processing phase 204, and an outputting/visualization phase 206.

The pre-processing phase 202 can also be subdivided into a series of activities, namely, building a backbone solution, which is a general knowledge graph (a first layer) enhanced with structured information (a second layer) and adding an additional layer of information for each user to model a user's personal knowledge and historic experience (a third layer).

An existing knowledge graph is used as a core knowledge graph including all nodes (facts) and connections (weight factors) as the first layer of the multi-layered knowledge graph. This core knowledge graph comprising relations of facts, e.g., terms of topics, that can be augmented with additional structured data which may come from the structured part of an existing knowledge graph. Alternatively, enterprise-owned knowledge graphs may be used as a core knowledge graph or another new knowledge graph may be built using existing knowledge graph creation tools from, e.g. text documents, images, and the like.

The second layer nodes/facts of the multi-layered knowledge graph comprising the additional structured data, such as, physical dimensions, age, and location data, are linked to the facts/nodes of the core knowledge graphs. It shall be noted that this second layer does not depend on a user's history. In one implementation, it can also be a generic layer that is the same for all application areas of the knowledge graph system. In another implementation, this second layer is constructed with a specific application in mind, using, e.g., keyword matching and NLP. For example, if the user is learning a language, the layer could involve relevant structured information, such as grammar tables, which can be taken out and/or are matched against the first layer with keyword matching and NLP.

Furthermore, impressions from a person's history, e.g., in the form of images from a smart phone, a social media platform, etc. may be used beside sound snippets. The images or pictures may be interpreted by the underlying system by, e.g., visual computing and/or possibly smoothed/adjusted using GANs before they may be linked to nodes of the first layer and the second layer. These impressions from a person's history build the third layer of the multi-layered knowledge graph.

In order to generate a most accurate multi-layered knowledge graph, additional information to the images representing a user's history may be used as metadata, i.e., data about the environment and the surroundings at the moment an image was taken. Such data may come from IoT sensors in an area where the user has the viewing experience. This can add another input channel that can help with feedback and lead to a better experience for the user. Also, this input can be considered by rendering the image/content to the user.

In a last step of the pre-processing phase 202, weight/weight values are initiated and potentially adapted in the multi-layered knowledge graph, in particular in the context of the third layer for a particular person. This can take into account how often a person has seen the picture or how many pictures have been taken of a certain object, as well as a person's "likes" for pictures in social media, pictures that the person tags, etc.

In addition, the age of the image/action history can be considered since the learning process is often influenced by the age of the personal memory, e.g., a person often does not remember small facts from a vacation 10 years ago but remembers almost everything from the last vacation. In this way, the weighting factors of the first layer and the second layer are initiated or adopted, if they already exist, with approaches such as those used by large companies for these search engines.

During the processing phase 204, the following activities can be performed: Firstly, an image and/or, e.g., a sound sequence is captured from the current setting of a person using the method and system herein. It may be mapped to the knowledge graph and build a fourth layer. The input can, e.g., be delivered via smart glasses or the camera of the user's smartphone. In another implementation, the system can track the user's actions and state, e.g., movements, actions and computer screens, emotional state, etc., in order to recognize more accurately the time and input that the user would appreciate an output by the system. The mapping is done via the first layer, the second layer, and the personal layer 3, preferably in this sequence.

Optionally, the user can state a question, e.g., "how big is the object compared to others", in order to further specify the kind of output that the system should generate and provide. In this case, the second layer data of the knowledge graph is used to provide the requested/queried information.

Additionally in the processing phase 204, the system can find the most relevant facts and/or nodes—and ideally also including a related image—within the knowledge graph that leads to an optimal experience for the user. Thereby, the most relevant image is considered to be the one with the highest average weight value on the path from the current setting of the fourth layer to a user note of the third layer, and adjusted by a gradually decreasing penalty term based on a number of existing connections to other nodes. This is because having strong connections make an input image more relevant, and therefore, more "learnable" for the user. However, if too many paths have to be traversed, even if they are all strongly connected, there may be an increasing likelihood of the input image not being that relevant. An additional penalty can be given to the age of the image.

Furthermore, neural machine translation can be used to translate "on-the-fly" relevant facts gathered in the knowledge graph into the user's preferred language in order to provide a most optimal experience to the user. This can also include taking what may be considered a complex vocabulary of explanations and translating into simpler verbiage to add in learning new content. A visualization of the output can also support this effort.

In order to generate a good visualization output in the outputting/visualization phase 206, a GAN system may be used to integrate reference objects into a current scenario, i.e., a current scene or setting. The GAN system would be able to "smooth" the output image so that two or more images can be combined in a nice-looking output image. Furthermore, the impact of the surroundings where the users having the viewing experience can also include IoT sensor data along with wearable/portable data collection devices.

As a final step, the system may collect feedback from the user regarding the quality of the presented image. It may also be based on a test result if someone was able to remember new knowledge. It may also include direct feedback from the user. Furthermore, the IoT sensors and or wearable/portable devices may provide measurement data about the user's happiness/usefulness/etc. All of this feedback may be used in reinforcement learning cycles.

In another embodiment, the system 200 can generalize the findings with regard to effective outputs across a user population. For example, it seems likely that providing the Eiffel Tower height as a reference when a person stands in front of the Statue of Liberty would be useful for many people.

The gathered feedback—in particular, via the feedback loop 208—can then suggest the personal weights in that multi-layered knowledge graph, in particular in the third layer to learn over time; reinforcement learning could be an option at this stage. A recommender system may be used to identify, e.g., based on user feedback, more images that can be used to learn current or future content, with either a collaborative filtering or content-based techniques, especially in cases in which a user may not have an extensive library of images to select from. In addition, image search engines such as similarity searches, reverse image search, image databases, etc., can be used to solve the issue of "cold start". Such a "random" element can also be useful, providing the user with new inputs and new stimuli. Otherwise, there would be a risk of the system 200 running out of effective outputs/mnemonics for the user.

When a VR device is being used, speech-to-text and text-to-speech, systems can be utilized, so that a user can provide feedback vocally and in real or near-real time.

Figure 3:
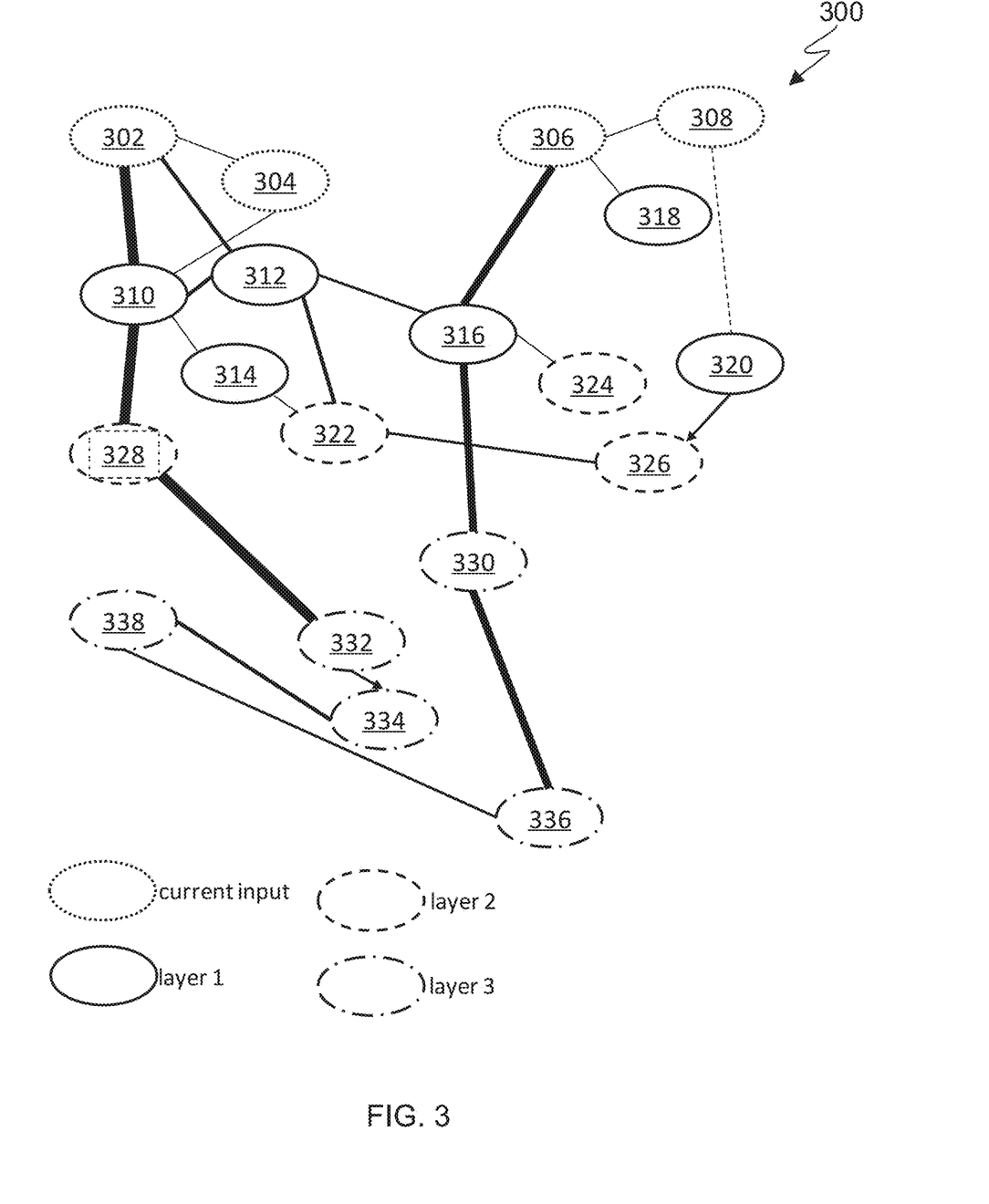
FIG. 3 shows a block diagram of a knowledge graph, in accordance with an embodiment of the present invention.

FIG. 3 shows a block diagram of a knowledge graph 300, in accordance with an embodiment of the present invention. The three/four different layers of the multi-layered knowledge graph 300 are shown using different line styles for the ellipses representing the nodes/facts of the knowledge graph. The core knowledge graph or layer 1 is represented by the solid ellipse lines.

Table 1 shows content terms beside the reference numerals used in FIG. 3. These terms can be understood as interpreted content of a currently received image which may be used as input to the multi-layered knowledge graph 300.

TABLE 1

| 302 | Statue of Liberty |
| 304 | sky |
| 306 | beach in Spanish = Playa |
| 308 | Textbook |

Table 2 shows reference numerals referring to nodes of layer 1 in the multi-layered knowledge graph 300.

TABLE 2

| 310 | Statue of Liberty |
| 312 | USA |
| 314 | NY |
| 316 | Beach |
| 318 | Ocean |
| 320 | Spain |

Furthermore, table 3 shows the application-specific structured data or facts of layer 2 which enhances the knowledge graph.

TABLE 3

| 322 | 50 states |
| 324 | Longest beach = Playa o Cassino |
| 326 | 50 provinces |
| 328 | Height = 93 m |

Table 4 comprises additional individualized/personal background facts and data from a personal history of a user or user specific attributes of layer 3.

TABLE 4

| 330 | Beach |
| 332 | Height = 323 m |
| 334 | Eiffel Tower |
| 336 | Beach soccer game |
| 338 | Paris |

It should also be noted that higher vague values in the exemplary multi-layered knowledge graph 300 are indicated by thicker lines between related nodes.

Figure 4:
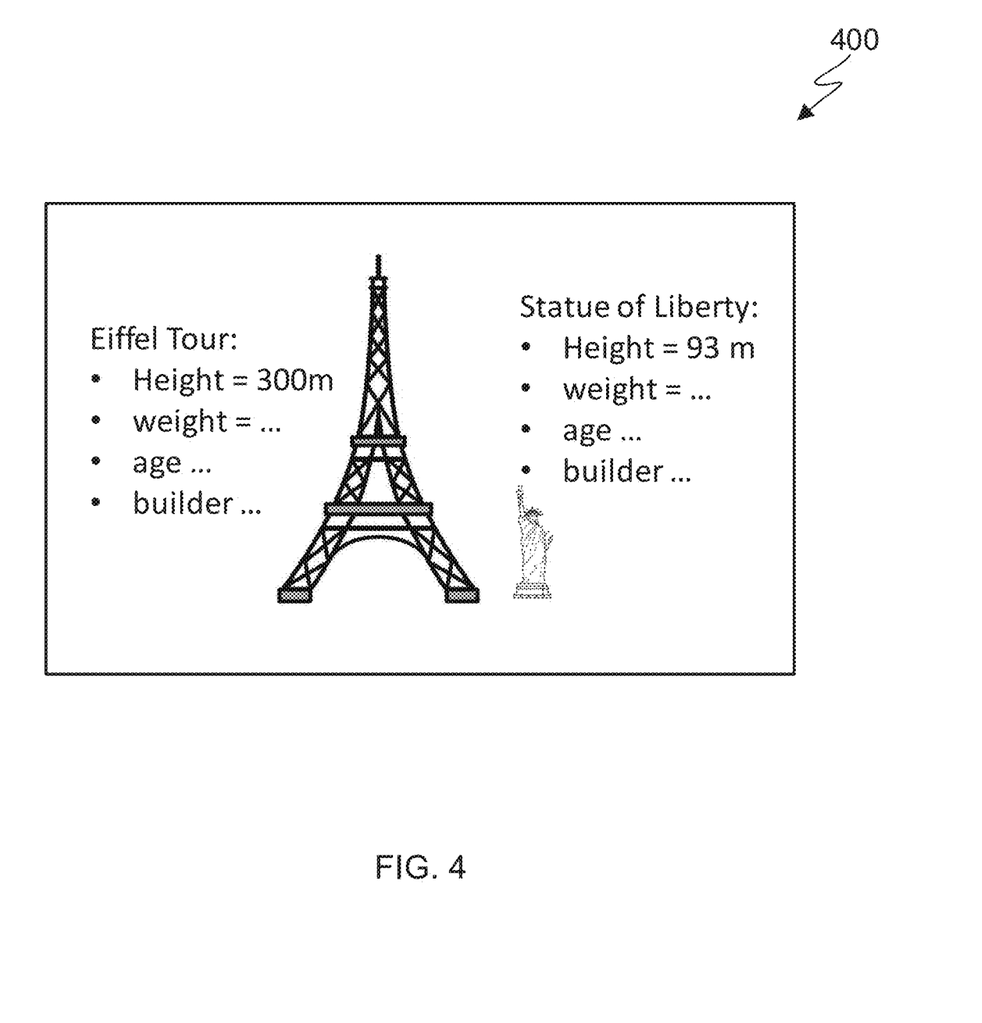
FIG. 4 shows an exemplary output of a multi-layered knowledge graph, in accordance with an embodiment of the present invention.

As a practical application and example, FIG. 4 shows an exemplary augmented output 400 of the multi-layered knowledge graph, in accordance with an embodiment of the present invention. The user may, e.g., direct the camera of a smartphone to capture the Statue of Liberty. Additionally, the user has images and information in their history facts about the Eiffel Tower and its dimensions. The user's experience is enhanced by a visualization of the Eiffel Tower next to the Statue of Liberty in order to provide a meaningful comparison and context of heights. Additionally, also the facts about the two buildings may be mapped into the resulting output image.

In another illustrative example, the user is studying Spanish and directs the smartphone camera towards the textbook with the Spanish word for beach (playa). The system 200 shows as a response an image to the user from the user history where the user is playing beach soccer, thus aiding retention of the word playa.

Figure 5:
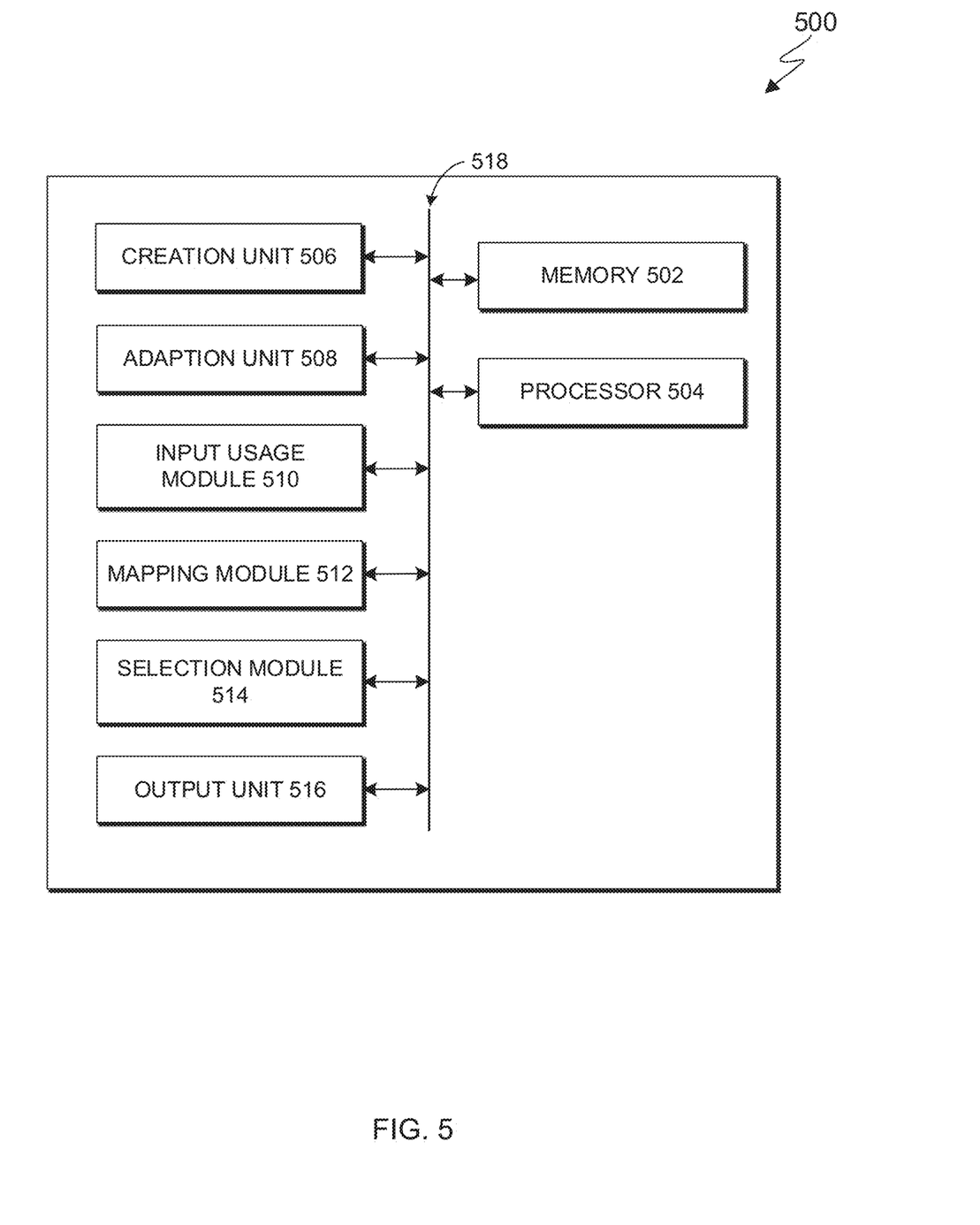
FIG. 5 shows a block diagram of an environment augmentation system, for providing an individualized enhancement to a knowledge graph, in accordance with an embodiment of the present invention.

FIG. 5 shows a block diagram of an environment augmentation system 500, for providing an individualized enhancement to a knowledge graph, in accordance with an embodiment of the present invention. The environment augmentation system 500 comprises a memory 502 communicatively coupled to a processor 504, wherein the memory 502 stores program code portions enabling the processor to perform the following: create, by creation unit 506, a multi-layered knowledge graph, comprising nodes and weighted edges in each layer. The knowledge graph comprises a core knowledge graph as a first layer, application-specific structured facts in a second layer, and a third layer of individualized facts.

The memory 502 stores additional program code enabling the processor to adapt, by adaption unit 508, weights in all layers of the knowledge graph based on the individualized facts; use, by input usage module 510, as input data to the knowledge graph individual environmental data; and map, by mapping module 512, the input data to the knowledge graph in a sequence of the first layer, the second layer, and the third layer (in that sequence).

Furthermore, the memory stores additionally program code enabling the processor to select, by selection module 514, as relevant nodes in the first and second layer those lying on a selected path from the input data via the first layer, the second layer, and the third layer having the highest average weight value along the selected path; and output, by output unit 516, the relevant node facts from the first layer and the second layer.

It may be noted that the units and modules may also be implemented as hardware modules and units being electrically connected to each other for signal and data exchanges. Hence, the memory 502, the process of 504, the creation unit 506, the adaption unit 508, the input usage module 510, the mapping module 512, the selection module 514, and the output unit 516 may either be electrically connected in a one-to-one way or, alternatively, by an environment augmentation system internal bus system 518.

Figure 6:
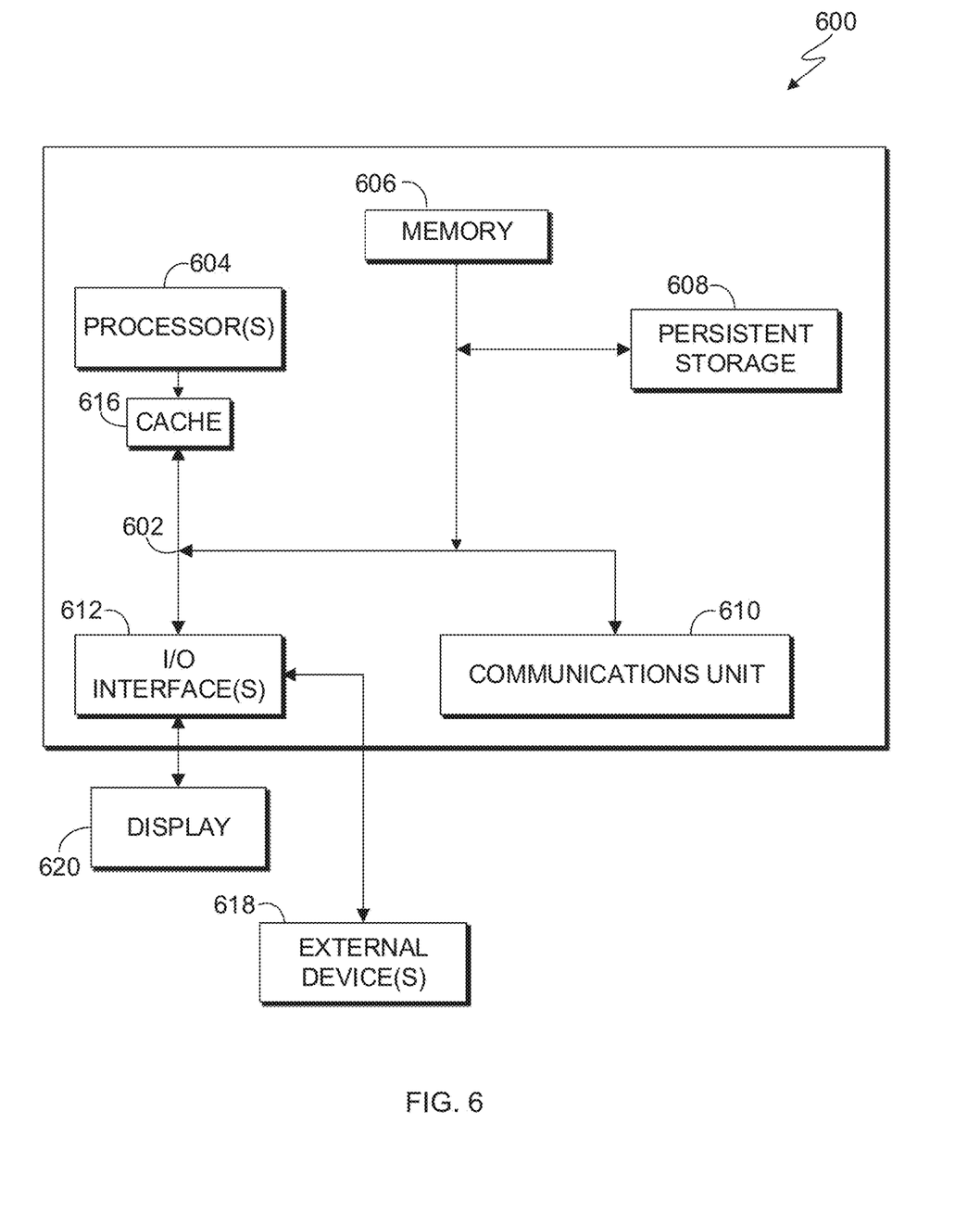
FIG. 6 shows a block diagram of components of a computing device executing the computer-implemented method within the environment augmentation system of FIG. 5, in accordance with an embodiment of the present invention.

FIG. 6 depicts a block diagram of components of computing device 600, executing the computer-implemented method 100 within the environment augmentation system 500 of FIG. 5, in accordance with an embodiment of the present invention. It should be appreciated that FIG. 6 provides only an illustration of one implementation and does not imply any limitations with regard to the environments in which different embodiments can be implemented. Many modifications to the depicted environment can be made.

Computing device 600 includes communications fabric 602, which provides communications between cache 616, memory 606, persistent storage 608, communications unit 610, and input/output (1/0) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Programs may be stored in persistent storage 608 and in memory 606 for execution and/or access by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Programs may be downloaded to persistent storage 608 through communications unit 610.

I/O interface(s) 612 allows for input and output of data with other devices that may be connected to server 110 and/or user computing device 120. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   creating, by one or more processors, a multi-layered knowledge graph, wherein the multi-layered knowledge graph comprises at least three layers with nodes and weighted edges in each layer, and wherein a first layer is a general knowledge graph with core facts, a second layer has application-specific structured facts, and a third layer has individualized facts for a user;
   adapting, by the one or more processors, weights in each layer of the multi-layered knowledge graph based on the individualized facts;
   decreasing weight factors of the weights along a selected paths according to a penalty term;
   using, by the one or more processors, individual environmental data of the user as input data to the multi-layered knowledge graph;
   mapping, by the one or more processors, the input data to the multi-layered knowledge graph in a sequence of the first layer, the second layer, and the third layer;

selecting, by the one or more processors, as relevant nodes in the first layer and the second layer, the relevant nodes lying on a selected path from the input data via the first layer, the second layer, and the third layer having the highest average weight value along the selected path; and outputting, by the one or more processors, facts of the relevant nodes from the first layer and the second layer.

2. The computer-implemented method of claim 1, wherein the individual environmental data comprises current environmental data at a time of the mapping, the selecting, and the outputting.

3. The computer-implemented method of claim 2, wherein the current environmental data comprise at least one of image data, sensor data, sound data, and an explicit query.

4. The computer-implemented method of claim 1, wherein adapting the weights in each layer of the multi-layered knowledge graph based on the individualized facts comprises:

increasing, by the one or more processors, weight factors along the selected path.

5. The computer-implemented method of claim 1, wherein outputting the facts of the relevant node from the first layer and the second layer comprises:

selecting, by the one or more processors, as a relevant node, a node of the third layer; and augmenting, by the one or more processors, the input data with at least one of the facts of the selected nodes.

6. The computer-implemented method of claim 5, further comprising:

translating, by the one or more processors, text of the facts of the selected nodes into a selectable language.

7. The computer-implemented method of claim 1, further comprising:

merging, by the one or more processors, an input image with an output image from one of the selected nodes using a generative adversarial network.

8. The computer-implemented method of claim 1, further comprising:

responsive to outputting the facts of the relevant node, receiving, by the one or more processors, feedback data, and adjusting, by the one or more processors, the weights along the selected path according to the received feedback data.

9. The computer-implemented method of claim 1, further comprising:

adding, by the one or more processors, edges and weights between nodes of the first layer and nodes of the second layer to nodes of the third layer using selected path data from another knowledge graph of a same kind of knowledge graph.

10. A computer program product comprising:

one or more computer readable storage media and program instructions collectively stored on the one or more computer readable storage media, the stored program instructions comprising:

program instructions to create a multi-layered knowledge graph, wherein the multi-layered knowledge graph comprises at least three layers with nodes and weighted edges in each layer, and wherein a first layer is a general knowledge graph with core facts, a second layer has application-specific structured facts, and a third layer has individualized facts for a user;

program instructions to adapt weights in each layer of the multi-layered knowledge graph based on the individualized facts;

program instructions to decrease weight factors of the weights along a selected paths according to a penalty term;

program instructions to use individual environmental data of the user as input data to the multi-layered knowledge graph;

program instructions to map the input data to the multi-layered knowledge graph in a sequence of the first layer, the second layer, and the third layer;

program instructions to select, as relevant nodes in the first layer and the second layer, the relevant nodes lying on a selected path from the input data via the first layer, the second layer, and the third layer having the highest average weight value along the selected path; and program instructions to output facts of the relevant nodes from the first layer and the second layer.

11. The computer program product of claim 10, wherein the individual environmental data comprises current environmental data at a time of the mapping, the selecting, and the outputting.

12. The computer program product of claim 11, wherein the current environmental data comprise at least one of image data, sensor data, sound data, and an explicit query.

13. The computer program product of claim 10, wherein the program instructions to adapt the weights in each layer of the multi-layered knowledge graph based on the individualized facts comprise:

program instructions to increase the weights along the selected path.

14. The computer program product of claim 10, wherein the program instructions to output the facts of the relevant node from the first layer and the second layer comprise:

program instructions to select, as a relevant node, a node of the third layer; and program instructions to augment the input data with at least one of the facts of the selected nodes.

15. The computer program product of claim 14, further comprising:

program instructions to translate text of the facts of the selected nodes into a selectable language.

16. The computer program product of claim 10, further comprising:

program instructions to merge an input image with an output image from one of the selected nodes using a generative adversarial network.

17. The computer program product of claim 10, further comprising:

responsive to outputting the facts of the relevant node, program instructions to receive feedback data, and program instructions to adjust the weights along the selected path according to the received feedback data.

18. The computer program product of claim 10, further comprising:

program instructions to add edges and weights between nodes of the first layer and nodes of the second layer to nodes of the third layer using selected path data from another knowledge graph of a same kind of knowledge graph.

19. A computer system comprising:

one or more computer processors;

one or more computer readable storage media;

program instructions to create a multi-layered knowledge graph wherein the multi-layered knowledge graph comprises at least three layers with nodes and weighted edges in each layer, and wherein a first layer is a general knowledge graph with core facts, a second layer has application-specific structured facts, and a third layer has individualized facts for a user;

program instructions to adapt weights in each layer of the multi-layered knowledge graph based on the individualized facts;

program instructions to decrease weight factors of the weights along a selected paths according to a penalty term;

program instructions to use individual environmental data of the user as input data to the multi-layered knowledge graph;

program instructions to map the input data to the multi-layered knowledge graph in a sequence of the first layer, the second layer, and the third layer;

program instructions to select, as relevant nodes in the first layer and the second layer, the relevant nodes lying on a selected path from the input data via the first layer, the second layer, and the third layer having the highest average weight value along the selected path; and program instructions to output facts of the relevant nodes from the first layer and the second layer.

20. The computer system of claim 19, wherein the individual environmental data comprises current environmental data at a time of the mapping, the selecting, and the outputting;

and wherein the current environmental data comprises at least one of image data, sensor data, sound data, and an explicit query.

* * * * *